United States Patent [19]

Lehan

[11] Patent Number: 4,462,081
[45] Date of Patent: Jul. 24, 1984

[54] SIGNAL PROCESSING SYSTEM

[75] Inventor: Frank W. Lehan, Santa Barbara, Calif.

[73] Assignee: System Development Corporation, Santa Monica, Calif.

[21] Appl. No.: 365,442

[22] Filed: Apr. 5, 1982

[51] Int. Cl.³ ........................ G06F 15/20; G06G 7/48
[52] U.S. Cl. .................................... 364/554; 364/572; 364/724; 364/825
[58] Field of Search ............... 364/554, 572, 574, 582, 364/724, 825

[56] References Cited

U.S. PATENT DOCUMENTS

| 3,400,370 | 9/1968 | Fukamachi | 364/554 |
| 3,833,797 | 9/1974 | Grobman et al. | 364/554 X |
| 4,090,243 | 5/1978 | Kotera et al. | 364/554 X |

OTHER PUBLICATIONS

"An Inequality and Associated Maximization Technique in Statistical Estimation for Probabilistic Functions of Markov Processes", *Inequalities*, vol. 3, 1972, Lenard Baum, Academic Press.
"Estimation Theory and Applications", pp. 175–185, Nasser E. Nahi, Robert E. Krieger Pub. Company, Huntington, N.Y., 1976.

*Primary Examiner*—Jerry Smith
*Assistant Examiner*—Allen MacDonald
*Attorney, Agent, or Firm*—Fulwider, Patton, Rieber, Lee & Utecht

[57] ABSTRACT

Apparatus and a related method for generating an estimate of the current state of an information source based upon the observed current and previous states of a related signal and on estimates of the effects of noise. The apparatus includes a state change probability matrix defining the probabilities of all possible state changes that the source is capable of assuming, states, a noise model for generating a set of probabilities indicative of the likelihood that an observed value of the signal would have occurred if the source were in each of its possible states, and circuitry for combining the set of probabilities from the noise model with the set of probabilities from the state change matrix, to provide a probability distribution indicative of the current underlying value of the source. The apparatus also includes a normalization circuit to maintain the sum of the probabilities in the resultant distribution at unity, and an appropriate circuit for computing an estimate of the underlying source state from the probability distribution.

12 Claims, 2 Drawing Figures

SIGNAL PROCESSING SYSTEM

BACKGROUND OF THE INVENTION

This invention relates generally to signal processing systems, and more particularly, to systems for estimating the true or underlying value of a time-varying signal, based upon prior observed values assumed by the signal and on the statistics of noise components affecting the value of the observations.

In many applications, such as in communications, an observed electrical signal may contain components derived from external sources of noise, and may also contain components due to variations in the source of the signal itself. In such situations, it is often desired to extract a true or underlying signal from the observed signal. By way of simple example, the underlying signal may be a pure sine wave, and it may be distorted by "phase jitter" in the signal source, causing variations in the phase of the signal, and by noise components introduced between the source of the signal and the Point at which it is observed. This is a problem commonly encountered in communications systems, and a well known technique for determining the phase of such a signal utilizes a phase-locked loop. It will be appreciated, however, that techniques of a more general nature for determining the value of an underlying signal from observed values of the signal would have application in areas other than those of phase-locked loops. Such applications are not limited to electrical or communications systems, but encompass any situation in which a time-varying quantity can be represented as an analog or digital electrical signal, which can then be processed to obtain an estimate of the true or underlying value of the related time-varying quantity.

For purposes of further illustration, it can be assumed that the source of such a time-varying quantity, or its electrical signal counterpart, is capable of assuming any of a finite number of states, or may be closely represented by a finite number of states. In general, it is possible to derive a set of probabilities defining the likelihood that the source state will change from one state to another, either by making use of a priori information or from the observations. These probabilities will define some types of state-to-state moves as relatively easy, i.e. having a high probability, others as relatively difficult, i.e. having a low probability, and some as impossible, i.e. having a zero probability. For example, if the underlying time varying quantity is a sine wave signal the signal will move from state to state in such manner to define the sine function. For this perfect case, the source state will have a one-hundred percent probability of moving to the next state defining the sine function and a zero probability of moving to all other states. If, however, the source is imperfect in some respect, there may be, for example, only a ninety-percent probability of moving to the proper state defining the sine function, a five-percent probability of moving too far, i.e., beyond the state corresponding with the perfect sine function, and a five-percent probability of not moving far enough. In this example, then, the underlying signal is still a sine wave, but the observed signal may depart from the ideal to a degree defined, in part, by the probabilities of the various state-to-state moves. In practice the underlying source is further masked by noise components or other sources of signal uncertainty affecting the observed signal.

The foregoing relatively simple example of probabilities of state-to-state moves is indicative of phase uncertainty, or phase jitter, of a sine wave source. Other parameters of the sine wave, such as peak amplitude and frequency, are assumed to be constant, and the source may be said to be defined by a one-dimensional state space. By way of contrast, a multi-dimensional state space defines the state-to-state probabilities when simultaneous variations in more than one parameter, such as phase and frequency, are possible.

As will be further explained below, it is a principal object of this invention to provide a signal processing module of general application, capable of generating an estimate of the current state of an underlying source based on the observed current state and previous states of an observed quantity related to the source and referred to as the signal, taking into consideration the effects of noise. To this extent, the invention is related to a Markov process, which may be defined as a process in which the probability distribution of the present state of a quantity is completely determined by the most recent prior state of that quantity.

Since, in a narrow sense, the invention can operate in the manner of a phase-locked loop, phase-locked loops can be viewed as the closest prior art to the present invention. However, phase-lock loops cannot be applied in the solution of more complex problems in which the signal source is to be analyzed in terms of its state values in a multi-dimensional state space, rather than a one-dimensional state space. The present invention is directed to a signal analysis module of the general type described, capable of being combined with other signal processing modules of the same type in order to perform analysis on such complex signal sources.

SUMMARY OF THE INVENTION

The present invention resides in a signal processing module for generating a probability distribution indicative of the current underlying value of a time-varying source, based upon an observed current value of a related signal, an estimate of the effect of noise and uncertainty on the observed value, the probabilities of all combinations of state-to-state changes in the time-varying source, and on a probability distribution indicative of a prior underlying value of the source state. The probability distribution indicative of the current underlying value of the source state can be utilized to obtain a single current estimate of the underlying source state, using any one of several techniques, such as by selecting the signal state value with the maximum probability of occurrence, or by using a weighted mean derived from the entire probability distribution.

Basically, and in general terms, the signal processing apparatus of the invention comprises state change probability matrix means defining the probabilities of all possible state changes of a source capable of assuming a finite number of states, noise model means for generating a set of probabilities indicative of the likelihood than an observed value of the source would have occurred if the underlying value of the signal were in each of the its possible states, and means for combining the set of probabilities from the noise model with the set of probabilities from the state change probability matrix means. A set of probabilities is thereby obtained indicative of the current state of the underlying source, and this probability set is fed back to the state change probability matrix, from which then can be derived a corresponding set of probabilities with respect to the next state to be assumed by the underlying source. A normalization circuit is also included, to ensure that the sum of the probabilities in the distribution indicative of the current value of the underlying source is maintained at unity. Without the normalization circuit, the sum of the probabilities would tend to continously increase or decrease, and an erroneous result would be obtained.

More specifically, the state change probability matrix is a resistive network having m input terminals and m output terminals, where m is the number of possible states of the time-varying source to be processed. The network operates as a signal multiplier and summing circuit. Each of the input signals is multiplied by a factor proportional to the probability that the source state can change to the state corresponding to the output line, and the signal products are summed for each output line. The input signals provided to the network represent the probabilities that the previous value of the time-varying source is in each of the m states, and the output signals from the matrix represent the probabilities that the current state of the source is in each of the m states, based only upon the probabilities of state-to-state changes of the source.

The output probabilities from the network are next multiplied by the corresponding probabilities, derived from a currently observed value of the signal, that the observed source state is in each of its m states. The product of these probabilities represents the probability distribution with respect to the current value of the underlying source. After normalization to ensure that the sum of these probabilities is unity, the current probability distribution is fed back to the input terminals of the state change probability matrix, in order to compute the probability distribution of the source state on the next observance of the related signal. The normalized probability distribution can also be used to calculate a weighted mean indicative of the best estimate of the state of the underlying source.

In a presently preferred embodiment of the invention, the probabilities for each of the possible states in state space are computed in a parallel fashion. However, it will be appreciated from the following more detailed description that alternative embodiments can employ sequential computation of the probabilities. In the embodiment illustrated herein, the probabilities are calculated based on the preceding history of the signal, but the invention is also applicable to the processing data in a "reverse time" mode, wherein an entire set of observed signals samples is first obtained, and then processed in the signal processing module of the invention in a reverse time sequence. By way of further generalization of the technique of the invention, if all of the observed signal data were available in storage and could be accessed in parallel, it might be desirable in some cases to process an entire set of data in parallel fashion rather than sample by sample as described.

It will be appreciated from the foregoing that the present invention represents a significant advance in the field of signal processing in general. In particular, the invention provides a widely applicable technique for deriving a probability distribution with respect to the present underlying value of the state of a source based upon the probabilities that the source state will change and on the probable effects of noise. Other aspects and advantages of the invention will become apparent from the following more detailed description, taken in conjunction with the accompanying drawings.

DESCRIPTION OF THE PREFERRED EMBODIMENT

Figure 1:
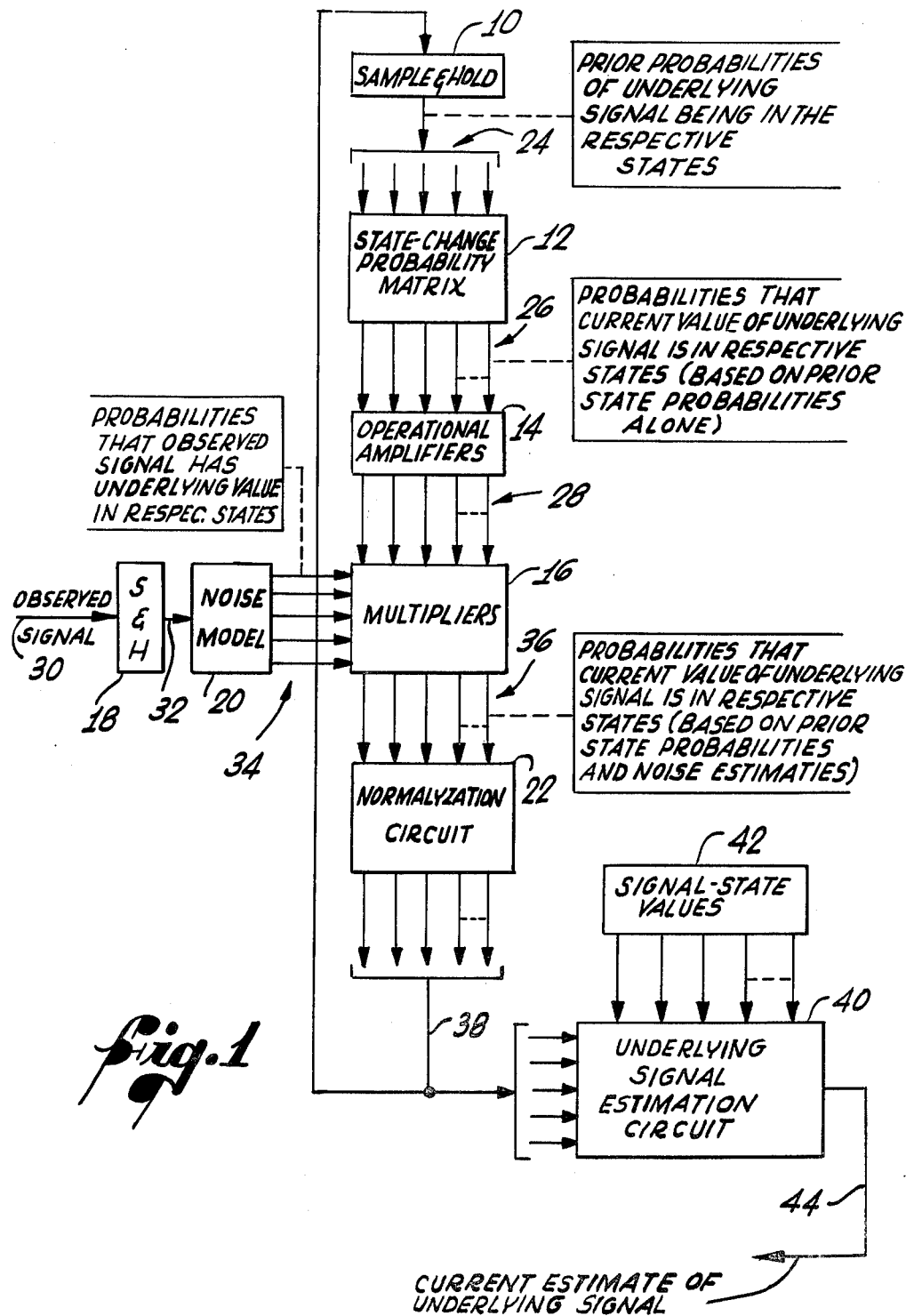
FIG. 1 is a simplified block diagram of signal processing apparatus connected in accordance with the present invention.

As shown in the drawings for purposes of illustration, the present invention is principally concerned with apparatus for estimating the probable underlying value of a time-varying source from presently and previously observed values of the signal. In accordance with the invention, a first set of probabilities is derived from a current value of the observed signal, based on the expected contributions of noise and on the known states of the underlying source, and this first set of probabilities is combined with a second set of probabilities derived from a probability matrix defining the likelihood of all possible state-to-state changes of the time-varying source. The resulting distribution of probabilities can be used to obtain an estimate of the current underlying value of the source state. The distribution is also fed back to the probability matrix in order to generate the second set of probabilities for the next observed sample of the source related signal.

As shown in FIG. 1, the apparatus of the invention includes a set of sample-and-hold circuits, indicated by reference numeral 10, a state change probability matrix 12, a set of operational amplifiers 14, a set of multipliers 16, another sample-and-hold circuit 18, a noise model 20 and a normalization circuit 22.

As will become apparent from the following description, the values sampled by the sample-and-hold circuits 10 represent a probability distribution with respect to the state of a source at a previously sampled value of an observed signal. Initially, the outputs from the sample and hold circuits 10, on lines 24 can be made equal quantities. The physical condition corresponding to this equality relationship of the inputs to the matrix 12 is that there was an equal probability that the time-varying source was in each of its possible states at a time corresponding to the prior sampled value of the signal. These probabilities, on lines 24, are applied to inputs to the state change probability matrix 12, which provides outputs, on lines 26, indicative of the probabilities that the current value of the time-varying source is in the respective states.

The probability matrix 12 defines the probabilities of all possible state-to-state moves of the time-varying source. For example, some state-to-state moves will be relatively easy, some relatively difficult, and some impossible. In a system in which the underlying source is a perfectly repetitive form, such as a sine wave, the probability of moving from one state to the next will be one-hundred percent and the other probabilities of other state-to-state moves will be zero. In a more generalized system, however, if there are m source states there will be a matrix of $m^2$ probabilities defining the possible state-to-state moves of the source. Thus, if the input to the matrix 12 represents the probability distribution with respect to the previous state of the underlying source, the outputs from the matrix on lines 26 represent a probability distribution with respect to the current value of the underlying source. These probabilities are amplified in operational amplifiers 14, and then transmitted over lines 28 to the multipliers 16.

The observed signal, provided on line 30, is sampled in sample-and-hold circuit 18, and transmitted over line 32 to the noise model 20, which provides, on output lines 34, a set of probabilities indicative of the validity and accuracy of the observed signal. In other words, there is a probability associated with each state of the underlying source, based both on the known waveform of the underlying source and on the estimated effect of noise on the underlying signal. These probabilities on line 34 are multipled by the corresponding probabilities on lines 28 in the multiplier 16, and the probability products are provided on output lines 36. A final step is processing by a normalization circuit 22, which ensures that the sum of the probabilities is maintained at unity. The outputs from the normalization circuit 22 represent the probability distribution estimating the current state of the underlying source. This distribution is fed back over lines 38 to the sample-and-hold circuits 10 in order to compute the next probability distribution for the source.

The lines 38 are also connected to an underlying source estimation circuit 40, which has available to it the known underlying source state values, indicated at 42. The function of the underlying source estimation circuit 40 is to provide a single current estimate of the underlying source on output line 44. The underlying source estimation circuit 40 may use the probability distribution in any desired manner to obtain the single current estimate of the underlying signal. For example, it could select the signal state having the highest probability in the probability distribution provided over lines 38. Alternatively, it could compute a weighted mean, by multiplying the probability distribution by the corresponding source state values and adding the resultant products.

Figure 2:
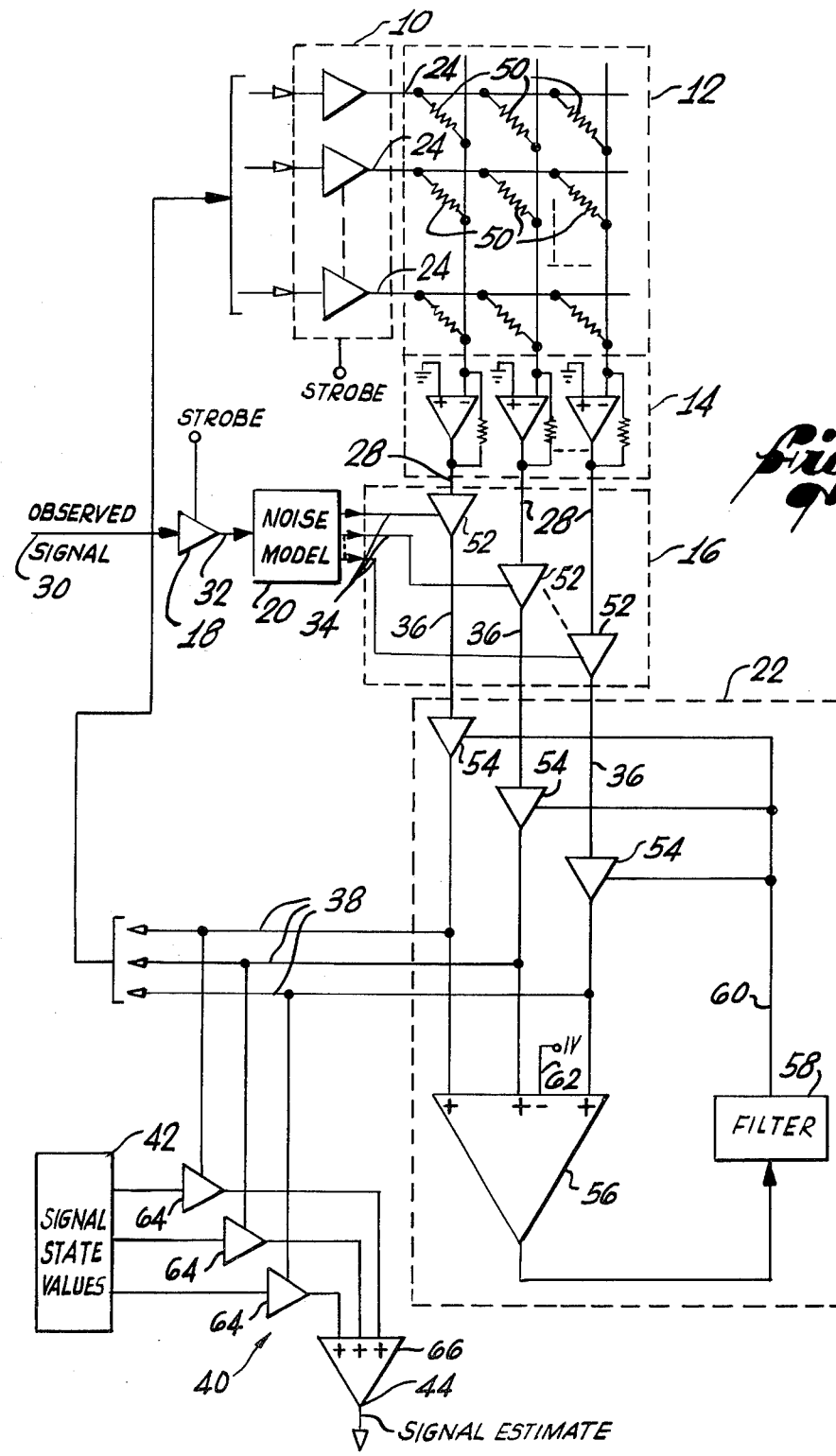
FIG. 2 is a more detailed schematic and block diagram of the apparatus of FIG. 1.

As shown in FIG. 2, the probability matrix 12 can be implemented as a resistive network comprising a separate resistor 50 at each intersection between the input lines 24 and the output lines 26. The multiplier 16 comprises a plurality of amplifiers 52, the inputs of which are provided on lines 28 from the operation amplifiers 14 and the outputs of which are transmitted over lines 36 to the normalization circuit 22. The gains of the amplifiers are controlled by the outputs on lines 34 from the noise model 20. The normalization circuit 22 includes a plurality of amplifiers 54, the outputs of which are connected as positive inputs to a summing amplifier 56. The output of the summing amplifier 56 is appropriately filtered in a filter 58, and applied over lines 60 as a gain control signal to the amplifiers 54. The only negative input to the summing amplifier is a signal equivalent to a unity probability, which could for example be one volt, as indicated at 62.

The normalization circuit 22 acts in the manner of an automatic gain control circuit to maintain the sum of the outputs equal to unity. The outputs of the amplifiers 54 serve as the outputs from the normalization circuit 22, and are connected over lines 38 back to the sample-and-hold circuits 10 as well as to the underlying signal estimation circuit 40. The latter is shown by way of example in FIG. 2 as being operative to multiply each of the source state values 42 by its corresponding probability in the probability distribution obtained from the normalization circuit 22. Multiplication is effected in a plurality of further amplifiers 64, the inputs of which are provided from the signal state values 42 and the gains of which are controlled by the probability distribution signals on lines 38. The outputs of the amplifiers 64 are applied as inputs to a summing amplifier 66, the output of which is the desired signal estimate on line 44.

Operation of the signal processing module can be viewed, in more mathematical terms, as being in accordance with the following equation:

$$F(J,T) = \frac{P[O(T),J] \sum_I F(I,T-1) \cdot A(I,J)}{\sum_J P[O(T),J] \sum_I F(I,T-1) \cdot A(I,J)}$$

where:

F(J,T) is a probability distribution for source states J at time T,

F(I,T−1) is the source state probability distribution at time T−1,

O(T) is the observed signal at time T,

P[O(T),J] is the probability distribution provided by the noise model 20, and is a function of the observed signal, the source state and an estimate of noise, and A(I,J) is the state change probability matrix 12.

The function of the summation sign and the product of F(I,T−1) and A(I,J) is performed by the probability matrix 12. The prior-time distribution F(I,T−1) is supplied over lines 24, and the transformed probability distribution represented by the expression beginning at the first summation sign is supplied over lines 26. The P function provides a probability for each source state (J) based on the known waveform underlying the signal and on the estimated noise contributions. Multiplication of the P-function probabilities and the transformed probabilities from the matrix 12 is effected in the amplifiers 16. The denominator expression provides the appropriate normalization of the equation for the probabilistic interpretation described, which function is performed in circuit 22.

It will be appreciated from the foregoing that the present invention represents a significant advance in the field of signal processing. It provides a processing module of general application for estimating the unknown state of a source based on an estimate of the effect of noise on a related observed signal, and on the known probabilities of source state-to-state transitions. It will also be appreciated that, although a particular embodiment of the invention has been described in detail for purposes of illustration, various modifications may be made without departing from the spirit and scope of the present invention. Accordingly, the invention is not to be limited except as by the appended claims.

I claim:

1. A signal processing system for generating a probability distribution indicative of the current underlying value of a time-varying source, said system comprising:

state change probability matrix means defining the probabilities of all possible state-to-state changes in a source capable of assuming any of a finite number of states, wherein said probability matrix means provides as an output a set of probabilities relating to the current source state, derived from a corresponding set of probabilities relating to the effect of noise on a related observed signal at present and prior sample times;

noise model means for generating a set of probabilities that an observed value of the time-varying signal would have occurred if the underlying value of the source were in each of its possible states; and means for combining the set of probabilities generated by said probability matrix means with the set of probabilities generated by said noise model means, to yield the desired probability distribution, which is then fed back to said probability matrix means for generation of a set of probabilities with respect to the next sample time.

2. A signal processing system as set forth in claim 1, and further including:

means for normalizing the desired probability distribution to ensure that the sum of all probabilities in the distribution is maintained at a value of unity.

3. A signal processing system as set forth in claim 1, and further including:

means for generating a single-valued estimate of the current value of the underlying source state from the desired probability distribution.

4. A signal processing system as set forth in claim 3, wherein said means for generating a single-valued estimate of the current value of the underlying source state includes:

means for multiplying each probability in the desired probability distribution by the corresponding source state value, to obtain a plurality of products; and means for summing the products obtained from said means for multiplying, to obtain a weighted mean value proportional to the required single-valued estimate.

5. A signal processing system for generating a probability distribution indicative of the current underlying value of a time-varying source capable of assuming or being represented by any of a plurality of states, said system comprising:

means for sampling an observed signal value;

noise and signal modeling means for generating from the observed value of the source a first set of probabilities, one for each of the signal states, indicative of the likelihood that observed value would have occurred for each of the underlying source states, based on an estimate of the effect of noise on the observed signal value;

a probability transformation matrix having a plurality of inputs corresponding to a previously obtained probability distribution with respect to the value of the source state at the previous sample time, and having a like plurality of outputs providing a second set of probabilities obtained by multiplying the input probability values by the matrix, which is indicative of the probabilities of all possible state-to-state moves of the source;

means for multiplying corresponding elements of the first and second sets of probabilities to obtain the desired probability distribution;

means for normalizing the desired probability distribution to ensure that the sum of its elements is maintained at unity;

means for obtaining a single-valued estimate of the current underlying source from the normalized probability distribution; and means for sampling the normalized probability distribution values and inputting them to said probability transformation matrix for estimation of the next value of the underlying source state.

6. A signal processing system as set forth in claim 5, wherein said means for obtaining a single-valued estimate includes:

means for multiplying each element of the normalized probability distribution by the corresponding source-state value to obtain a plurality of signal products; and means for summing the products thereby obtained to generate a signal proportional to the desired single-valued estimate.

7. A signal processing system as set forth in claim 5, wherein:

said probability transformation matrix includes an array of resistive elements; and said means for multiplying corresponding elements of the first and second sets of probabilities include a plurality of amplifiers having input terminals to which signals proportional to one set of probabilities are applied, and having gain control terminals to which signals corresponding to the other set of pluralities are applied.

8. A signal processing system as set forth in claim 5, wherein said means for normalizing includes:

a plurality of amplifiers having input terminals to which corresponding to the elements of the unnormalized distribution are applied, and having gain control terminals;

a summing amplifier coupled to receive as positive inputs the outputs from said amplifiers and to receive as a negative input a signal equivalent to a unity probability; and a filter coupled to smooth the output of said summing amplifiers, whereby said amplifiers operate to scale the un-normalized probability elements to maintain the sum of the normalized elements at unity.

9. A method for processing observed samples of a time-varying signal to obtain a probability distribution conditioned on the current underlying source state, said method comprising the steps of:

deriving a first set of probabilities from a probability distribution with respect to the source state value at a prior sample time, based on the probabilities of all possible state-to-state moves of the source;

deriving a second set of probabilities from the current observed value of the signal, the second set of probabilities having a probability value corresponding to each source state and indicating the likelihood of the observed value conditioned on the source state, based on an estimate of the effect of noise on the observed value; and combining the first and second sets of probabilities to obtain the desired probability distribution indicative of the current underlying value of the signal, which distribution is also employed in said first mentioned deriving step to obtain a first set of probabilities with respect to the next value assumed by the signal.

10. A method as set forth in claim 9, and further including the step of:

normalizing the desired probability distribution by scaling each of its elements equally to maintain their sum at unity.

11. A method as set forth in claim 9, and further including the step of:

generating from the desired probability distribution a single-valued estimate of the current underlying value of the source.

12. A method as set forth in claim 11, wherein said step of generating a single-valued estimate includes:

multiplying each probability in the desired distribution by a corresponding signal-state value; and summing the resultant products.

* * * * *